United States Patent
Leonida et al.

[11] Patent Number: 5,466,354
[45] Date of Patent: * Nov. 14, 1995

[54] METAL COMPRESSION PAD FOR AN ELECTROLYSIS CELL

[75] Inventors: Andrei Leonida, West Hartford; Lawrence C. Moulthrop, Windsor; Kurt M. Critz, Enfield, all of Conn.

[73] Assignee: United Technologies Corporation, Hartford, Conn.

[*] Notice: The portion of the term of this patent subsequent to Jun. 28, 2011, has been disclaimed.

[21] Appl. No.: 309,258

[22] Filed: Sep. 20, 1994

Related U.S. Application Data

[63] Continuation of Ser. No. 991,906, Dec. 17, 1992, Pat. No. 5,366,823.

[51] Int. Cl.[6] ................................................ H01M 2/00
[52] U.S. Cl. ........................ 204/252; 204/279; 204/296; 428/131; 428/195; 428/209; 428/323; 428/328; 428/427; 429/34; 429/66
[58] Field of Search ................... 429/34, 66; 428/131, 428/195, 209, 323, 328, 457; 204/252, 296, 279

[56] References Cited

U.S. PATENT DOCUMENTS

| | | | |
|---|---|---|---|
| 4,020,242 | 4/1977 | Okazaki et al. | 429/66 |
| 5,324,565 | 6/1994 | Leonida et al. | 428/131 |
| 5,366,823 | 11/1994 | Leonida et al. | 429/34 |

*Primary Examiner*—Prince Willis, Jr.
*Assistant Examiner*—M. Nuzzolillo
*Attorney, Agent, or Firm*—Malcolm J. Chisholm, Jr.

[57] ABSTRACT

Accumulated dimensional variations in fuel cells and electrolysis cell assemblies can reduce the efficiency of the assembly and provide leakage paths for fuel and oxidant. A metal compression pad comprised of a metal having an elastic strain of about 3% to about 40% at about 2,500 psig can compensate for component dimensional variations and improve inter-cell conductivity at pressures up to and exceeding about 10,000 psig.

18 Claims, 2 Drawing Sheets

METAL COMPRESSION PAD FOR AN ELECTROLYSIS CELL

This is a continuation of application Ser. No. 07/991,906, filed on Dec. 17, 1992, now U.S. Pat. No. 5,366,823.

CROSS REFERENCE TO RELATED APPLICATION

Reference is hereby made to commonly owned U.S. patent application Docket Ser. No. H2216-SS/EL, U.S. Ser. No., 07/991,905, now U.S. Pat. No. 5,324,565, which discloses subject matter related to the subject matter of the present application.

TECHNICAL FIELD

The present invention relates to a compression pad for compensating for component dimensional variations within a system and especially relates to a metal compression pad for compensating for component dimensional variations within a cell.

BACKGROUND OF THE INVENTION

An electrolysis cell is a mechanical assembly for electrolyzing water to hydrogen and oxygen gas. To meet hydrogen and oxygen production requirements, a plurality of electrolysis cells are often assembled in a single module or stack. FIG. 1 illustrates a bi-polar electrolysis cell stack where a plurality of electrolysis cells, cell 1, cell 2, and cell 3, are stacked and electrically connected in series. The major cell stack components are, sequentially: anode electrode 5, solid polymer electrolyte 7, and cathode electrode 3, and cathode and anode chambers located in the frames 10 which surround the components. All of these components are thin, flat and rigid, with the anode electrodes 5 and cathode electrodes 3 having an active area of catalyst, 4 and 2 respectively, in contact with the electrolyte. In order to ensure optimum decomposition of the water to hydrogen ions and oxygen, formation of molecular oxygen, and conversion of the hydrogen ions to molecular hydrogen, uniform current distribution across the active areas of the catalyst is required. Uniform current distribution requires uniform contact pressure over these active areas.

However, uniform contact pressure over the active areas of the anode and cathode electrodes is seldom attained solely through design since each component's dimensions vary within some specified limits due to individual component fabrication by various production methods. Standard electrolysis cells often show compounded component dimensional variations of about 0.007 to about 0.010 inches due to fabrication limitations, with additional dimensional variations of up to about 0.002 inches/inch due to differential thermal expansion during electrolysis cell operation.

An elastic component, known as a compression pad 9, is included in electrolysis cell stacks in order to attain the electrolysis cell stack requirements of uniform contact pressure over the active area of the anode and cathode electrodes, sufficient contact pressure to prevent movement of the electrolyte which causes degradation thereof, and fluid tight seals to prevent mixing of the product gases which can cause an explosion. To date, this compression pad 9 compensates for dimensional variations to maintain uniform contact over the active areas up to pressures of about 500 psig for an electrically conductive compression pad, and up to pressures of about 900 psig for an electrically nonconductive compression pad.

Although the compression pad can compensate for dimensional variations at pressures up to about 900 psig, more and more applications require increased gas delivery pressure capabilities, many beyond the capability of prior art compression pads. Increased pressure requirements were initially addressed by enclosing the entire cell stack within a pressure vessel to limit the maximum load across the compression pad to about 200 psig. In this configuration, the compression pad was vented to the vessel and the stack was operated in a balanced pressure mode, i.e. both gases were produced at approximately the same pressure of up to about 6,000 psig. The vessel plus the pressure controls associated with this configuration, however, added significant weight and expense to the system.

Electrolysis cell stacks without a pressure vessel are simpler, lighter, and less expensive than those requiring pressure vessels. In this configuration, the compression pad is totally sealed, i.e. not externally vented, and must withstand significantly higher pressure differentials, approximately equal to the sum of the highest internal pressure during operation (up to about 1,000 psig) and the compression required to maintain uniform contact. This differential pressure can attain about 1,500 psig while the compression pad 9 can only effectively compensate for dimensional variations up to about 900 psig. Therefore, at high pressures, above about 900 psig, the traditional material and design are only marginally useful as a compression pad.

What is needed in the art is a high pressure compatible, electrically conductive compression pad useful in maintaining uniform contact at pressure differentials up to and exceeding about 6,000 psig.

DISCLOSURE OF THE INVENTION

The present invention relates to an improved electrolysis cell capable of operating at pressures above about 1,500 psig. The electrolysis cell comprises an anode electrode, a cathode electrode, and an electrolyte disposed therebetween while the improvement comprises an improved compression pad. This compression pad comprises a porous metal having sufficient porosity to attain an elastic strain of about 3% to about 40% at a pressure of about 2,500 psig.

The foregoing and other features and advantages of the present invention will become more apparent from the following description and accompanying drawings.

BEST MODE FOR CARRYING OUT THE INVENTION

Figure 2:
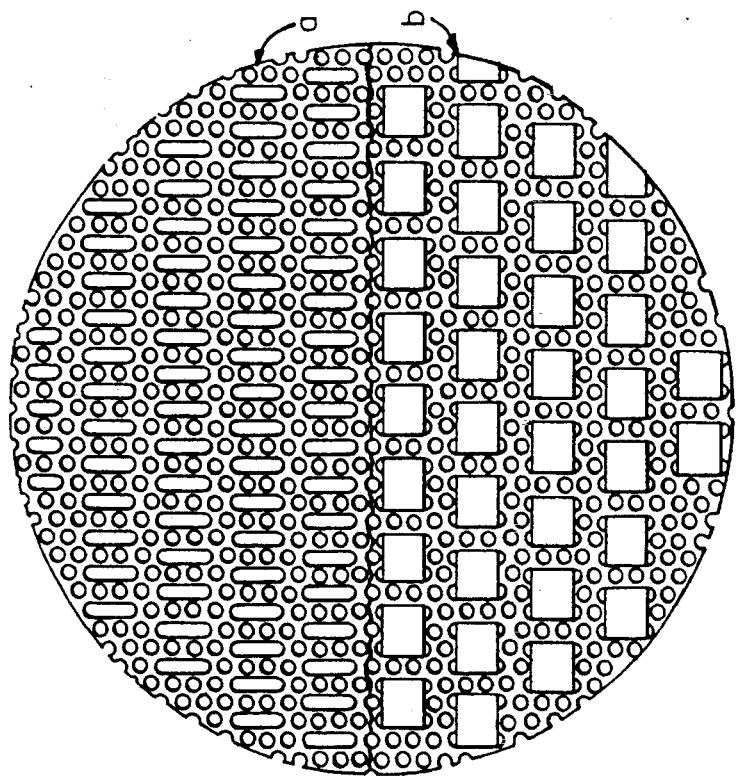
FIG. 2 is an embodiment of the prior art compression pad.
Figure 1:
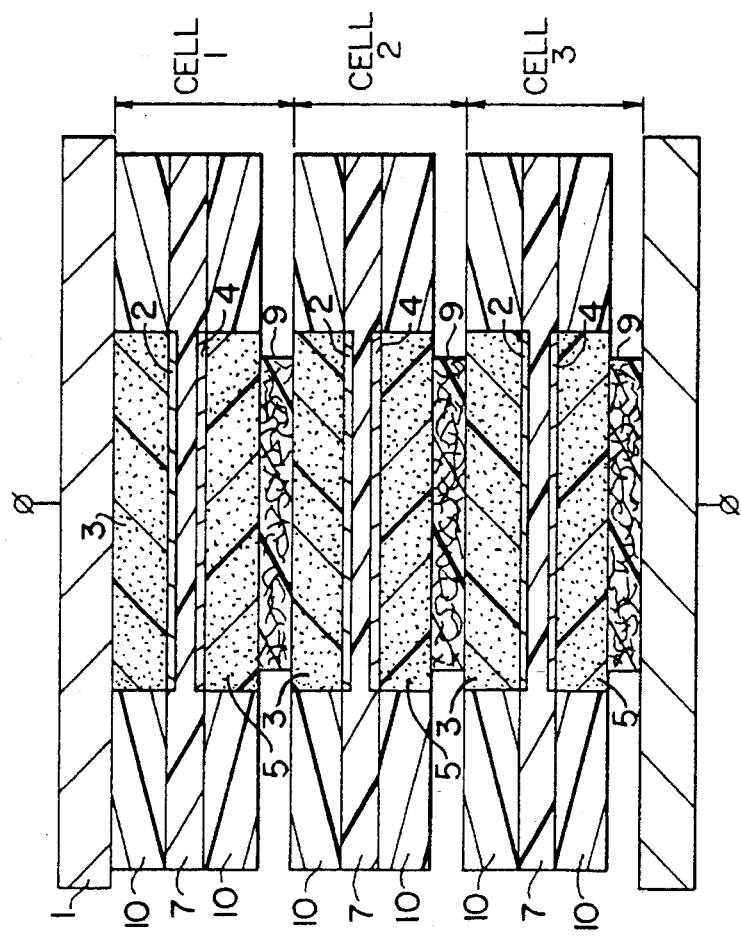
FIG. 1 is an illustration of a bi-polar electrolysis cell stack.

The metallic compression pad of the present invention compensates for dimensional variations in the components of a fuel cell, electrolysis cell, or cell stack thereof (hereinafter referred to as cell) to maintain uniform contact pressure over the active areas of the electrodes over the entire range of operating conditions up to and exceeding about 10,000 psig without the use of a pressure vessel.

This compression pad comprises a metal sheet having sufficient porosity to attain an elastic strain sufficient to compensate for the component dimensional variations at pressures greater than about 1,500 psig, preferably greater than about 2,500 psig, and feasibly to pressure differentials exceeding about 10,000 psig. The porosity of the metal is a balance between the state of the art techniques for producing such pads and attaining the desired metal compression pad characteristics including elastic strain. The porosity typically ranges from about 15% to about 85%, with about 20% to about 60% preferred, and about 25% to about 45% especially preferred.

Other important characteristics of these metallic compression pads include elasticity, elastic strain, substantially uniform thickness, and electrical resistance. The elasticity refers to the metallic compression pad's ability to return to its original thickness after it has been compressed, while its elastic strain refers to the change in thickness of the compression pad from its uncompressed to its compressed state. High elastic strains are useful since as the elastic strain increases the required thickness of the metallic compression pad decreases, thereby decreasing the weight and volume of the electrolysis cell which translates to cost savings. However, the structural integrity of the metallic compression pad also decreases with increasing elastic strain. Consequently, the preferred elastic strain, which is a balance between structural integrity and metallic compression pad thickness, ranges from about 3% to about 40% or greater, with about 7% to about 25% especially preferred.

The thickness of the metallic compression pad, which is preferably substantially uniform, is a function of its elastic strain and the component dimensional variation to be compensated. Uniform thickness ensures maintenance of uniform contact pressure over the active areas of the electrodes during compression. Although the compression pad thickness can vary greatly depending upon the elastic strain and the component dimensional variation, the metallic compression pad is typically about 0.015 inches to about 0.04 inches thick or thicker.

With respect to the electrical resistance, when the compression pad is utilized in a bi-polar electrolysis cell stack it is necessary to maintain an electrical circuit between individual cells, and therefore through the compression pad. Consequently, the metallic compression pad should have a low electrical resistivity, below about 0.1 ohm·cm, and preferably below about 0.01 ohm·cm or lower.

Possible metals possessing the desired elasticity, elastic strain, and electrical resistance include, but are not limited to, copper, nickel, and copper and nickel based alloys thereof, such as those produced by Technetics Corp., DeLand, Fla., and Hogen Industries, Mentor, Ohio, among others. One such alloy is known as HASTELOY® which is an alloy of carbon (0.05–0.15%), manganese (up to 1%), silicon (up to 1%), chromium (20.0–23%), molybdenum (8–10%), tungsten (0.2–1%), cobalt (0.5–2.5%), iron (17–20%), with the balance nickel, having a porosity of about 55%, an electrical resistance less than about 0.01 ohm·cm, and an elastic strain of about 7.5% at about 2,500 psig.

Generally these compression pads are formed by sintering metal particles or fibers into a sheet having a porosity of about 15% to about 85%. The compression pad formation can employ any conventional technique of forming a metal into a sheet having an elastic strain of about 3% to about 40% and the requisite porosity. For example, porous copper and nickel can be cold worked to the desired density by forming it into a layer and pressing or rolling the layer such that the thickness of thereof decreases about 50%. The layer is then cut to the desired pad dimensions. Other possible formation techniques include, but are not limited to, radiation, surface chemical transformation, alloying, special heat treatments such as those well known in the art for producing elastic springs, and other conventional means.

Figure 3:
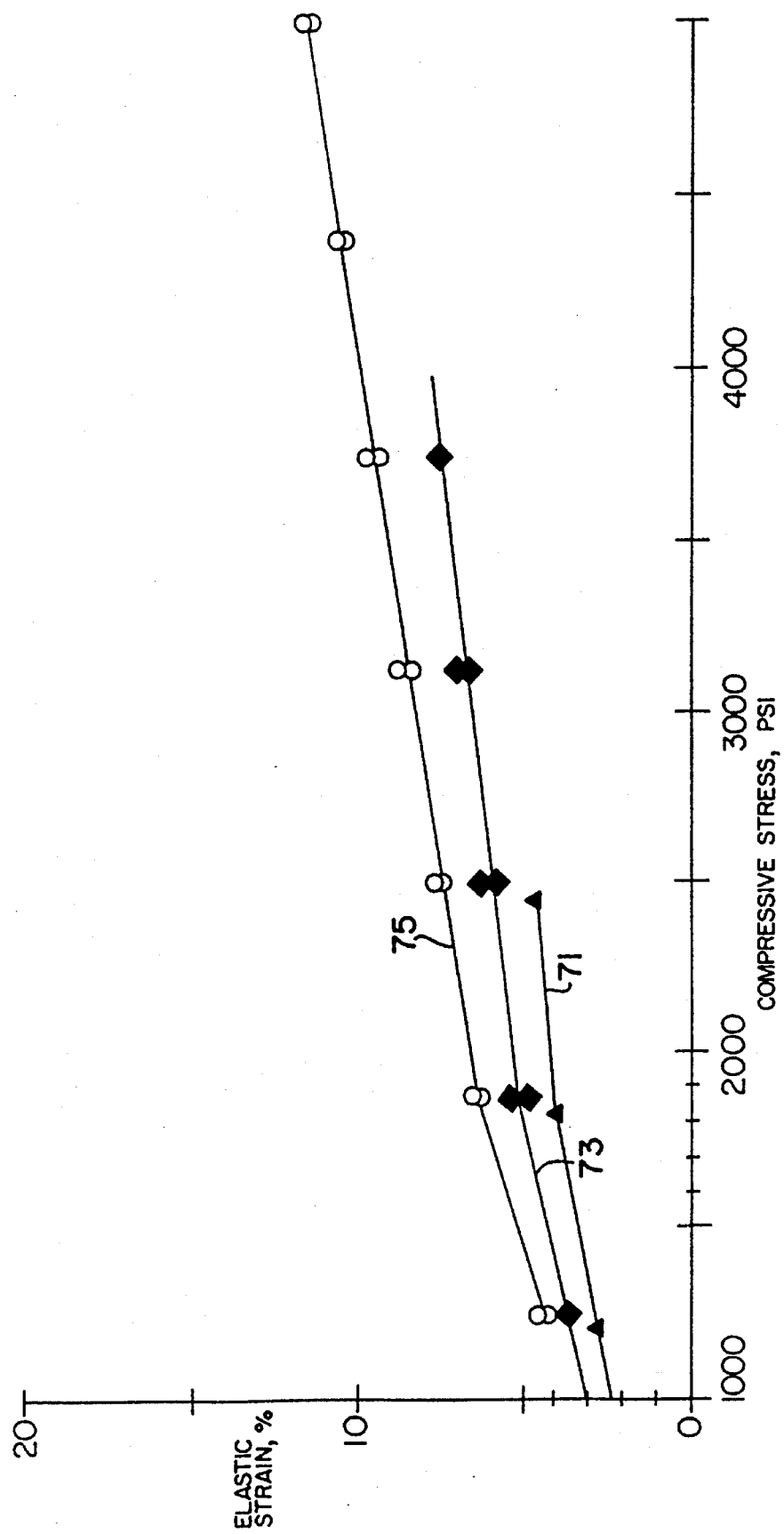
FIG. 3 is a graph of the strain of the high pressure metal compression pad of the present invention at given pressures.

Referring to FIG. 3, which illustrates compression characteristics of manufactured and tested metal compression pads of the present invention. The nickel compression pad, having a porosity of about 43%, achieved an elastic strain of about 3.5% at about 1,600 psig and an elastic strain of about 4.8% at about 2,500 psig. (line 71). The copper compression pad, having a porosity of about 40%, achieved an elastic strain of 3.5% at about 1,500 psig, an elastic strain of about 4.0% at about 1,800 psig, and an elastic strain of about 7.5% at about 3,750 psig (line 73). The HASTELOY compression pad, having a porosity of about 55%, achieved an elastic strain of about 5.0% at about 1,500 psig, about 10% at about 3,750 psig, and about 11.5% at about 5,000 psig. (line 75). Consequently, all of these compression pads can be employed in an electrolysis cell stack to compensate for component dimensional variations at pressures up to and exceeding about 10,000 psig. Additionally, these compression pads can be utilized at pressures below about 1,500 psig, although not very practically since the elastic strain is so low the pad will not compensate for much dimensional variation.

The metallic compression pad of the present invention is an improvement over the prior art, allowing an operating pressure range exceeding about 6,000 psig and conceivably exceeding about 10,000 psig while maintaining a conductive path, uniform contact pressure, fluid tight seals, and preventing movement of the electrolyte. Additionally, it is believed that the metal compression pad of the present invention can operate in unlimited pressure differentials by adjusting the porosity accordingly.

It should be noted that the present invention can be utilized in other devices beside cells where the elimination of dimensional variations is similarly desired, such as, for example, sealed secondary batteries of the prismatic cell construction.

Although the present invention has been shown and described with respect to detailed embodiments thereof, it will be understood by those skilled in the art that various changes in form and detail thereof may be made without departing from the spirit and scope of the claimed invention.

We claim:

1. An improved electrolysis cell having an anode electrode, a cathode electrode, and an electrolyte disposed therebetween, wherein the improvement comprises: a compression pad for compensating for component dimensional variations at pressures exceeding about 1,500 psig, said compression pad comprising: a metal having sufficient porosity to attain an elastic strain between about 3% and about 40% at about 2,500 psig.

2. An improved cell as in claim 1, wherein said porosity is about 15% to about 85%.

3. An improved cell as in claim 1, wherein said porosity is about 20% to about 60%.

4. An improved cell as in claim 1, wherein said metal is selected from the group consisting of copper, nickel, stainless steel, or alloys or mixtures thereof.

5. An improved cell as in claim 1, wherein said compression pad is capable of compensating for component dimensional variations up to pressures of about 10,000 psig.

6. An improved cell as in claim 1, wherein said electrolysis cell is an electrolysis cell stack.

7. An improved electrolysis cell having an anode electrode, a cathode electrode, and an electrolyte disposed therebetween, and having an operational pressure range, wherein during operation of the cell internal pressures within the cell increase through the operational pressure range and return to a non-operating pressure when the cell is not operating, wherein the improvement comprises: a compression pad for compensating for component dimensional variations at pressures exceeding about 1,500 psig, said compression pad comprising: an elastic metal that is compressed as internal pressures within the cell increase during operation and that returns to its original thickness after it has been compressed and the cell is not operating, the metal having sufficient porosity to attain an elastic strain between about 3% and about 40% at about 2,500 psig.

8. An improved cell as in claim 7, wherein said porosity is about 15% to about 85%.

9. An improved cell as in claim 7, wherein said porosity is about 20% to about 60%.

10. An improved cell as in claim 7, wherein said metal is selected from the group consisting of copper, nickel, stainless steel, or alloys or mixtures thereof.

11. An improved cell as in claim 7, wherein said compression pad is capable of compensating for component dimensional variations up to pressures of about 10,000 psig.

12. An improved electrolysis cell as in claim 7, wherein said cell is an electrolysis cell stack.

13. An improved electrolysis cell having an anode electrode, a cathode electrode, and an electrolyte disposed therebetween, wherein the improvement comprises: a compression pad for compensating for component dimensional variations at pressures exceeding about 1,500 psig, said compression pad comprising: a cold worked metal, compressed in fabrication so that its thickness decreases about 50%, and having sufficient porosity to attain an elastic strain between about 3% and about 40% at about 2,500 psig.

14. An improved cell as in claim 13, wherein said porosity is about 15% to about 85%.

15. An improved cell as in claim 13, wherein said porosity is about 20% to about 60%.

16. An improved cell as in claim 13, wherein said metal is selected from the group consisting of copper, nickel, stainless steel, or alloys or mixtures thereof.

17. An improved cell as in claim 13, wherein said compression pad is capable of compensating for component dimensional variations up to pressures of about 10,000 psig.

18. An improved electrolysis cell as in claim 13, wherein said cell is an electrolysis cell stack.

* * * * *